United States Patent
Eder et al.

(10) Patent No.: US 11,697,855 B2
(45) Date of Patent: *Jul. 11, 2023

(54) METHOD AND DEVICE FOR DIRECT REDUCTION WITH DRY VENT GAS DE-DUSTING

(71) Applicant: Primetals Technologies Austria GmbH, Linz (AT)

(72) Inventors: Thomas Eder, Traun (AT); Robert Millner, Loosdorf (AT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 671 days.

This patent is subject to a terminal disclaimer.

(21) Appl. No.: 16/305,926

(22) PCT Filed: Jun. 8, 2017

(86) PCT No.: PCT/EP2017/063974
§ 371 (c)(1),
(2) Date: Nov. 30, 2018

(87) PCT Pub. No.: WO2017/211956
PCT Pub. Date: Dec. 14, 2017

(65) Prior Publication Data
US 2020/0332377 A1    Oct. 22, 2020

(30) Foreign Application Priority Data
Jun. 9, 2016   (EP) .................................... 16173648

(51) Int. Cl.
*F27B 1/21* (2006.01)
*C21B 13/00* (2006.01)
*F27D 17/00* (2006.01)

(52) U.S. Cl.
CPC ........ *C21B 13/0073* (2013.01); *C21B 13/004* (2013.01); *F27B 1/21* (2013.01); *F27D 17/008* (2013.01)

(58) Field of Classification Search
CPC ... C21B 13/004; C21B 13/0073; C21B 13/02; F27B 1/21; F27D 17/008; F27D 2019/0068; Y02P 10/122
(Continued)

(56) References Cited

U.S. PATENT DOCUMENTS

| | | | |
|---|---|---|---|
| 4,188,022 A | 2/1980 | Beggs et al. | 266/195 |
| 4,605,205 A | 8/1986 | Langner et al. | 266/160 |

(Continued)

FOREIGN PATENT DOCUMENTS

| | | |
|---|---|---|
| CN | 85 1 03266 A | 10/1986 |
| CN | 1438331 A | 8/2003 |

(Continued)

OTHER PUBLICATIONS

NPL: on-line translation of JP 107289667 A, Oct. 2017 (Year: 2017).*

(Continued)

*Primary Examiner* — Jie Yang
(74) *Attorney, Agent, or Firm* — Ostrolenk Faber LLP

(57) ABSTRACT

A method for direct reduction of metal oxide-containing starting materials to produce metallized material by contact with hot reduction gas in a reduction unit (1), wherein the product of the direct reduction is discharged from the reduction unit (1) by means of a product discharge device (3) which is flushed with seal gas and from which vent gas is drawn and subsequently de-dusted. The vent gas is de-dusted dry and the content of at least one gaseous constituent is reduced by catalytic conversion or combustion. Also, a device for carrying out the method is disclosed.

2 Claims, 1 Drawing Sheet

(58) Field of Classification Search
USPC .......................................................... 75/488
See application file for complete search history.

(56) References Cited

U.S. PATENT DOCUMENTS

| | | | |
|---|---|---|---|
| 9,428,818 | B2 | 8/2016 | Heckmann et al. |
| 9,797,026 | B2 | 10/2017 | Millner |
| 2009/0211401 | A1* | 8/2009 | Zendejas-Martinez ..................... C22B 5/12 75/392 |
| 2020/0318206 | A1* | 10/2020 | Millner ................. F27B 1/21 |

FOREIGN PATENT DOCUMENTS

| CN | 107289667 A | * 10/2017 | |
| EP | 0 166 679 A1 | 1/1986 | |
| EP | 3255157 A1 | * 12/2017 | ........... C21B 13/004 |
| RU | 2532202 C2 | 10/2014 | |
| WO | WO 2008/123962 A1 | 10/2008 | |
| WO | WO 2011/012448 A1 | 2/2011 | |
| WO | WO 2011/012452 A1 | 2/2011 | |
| WO | WO 2013/045260 A2 | 4/2013 | |

OTHER PUBLICATIONS

International Search Report dated Jul. 4, 2017 in corresponding PCT International Application No. PCT/EP2017/063974.
Written Opinion dated Jul. 4, 2017 in corresponding PCT International Application No. PCT/EP2017/063974.
European Search Report dated Dec. 5, 2016 in corresponding European Patent Application No. 16173648.3.
Russian Office Action, dated Oct. 8, 2020, issued in corresponding Russian Patent Application No. 2018142743(071254). English Translation. Total 11 Pages.

* cited by examiner

METHOD AND DEVICE FOR DIRECT REDUCTION WITH DRY VENT GAS DE-DUSTING

CROSS-REFERENCE TO RELATED APPLICATIONS

The present application is a 35 U.S.C. §§ 371 national phase conversion of PCT/EP2017/063974, filed Jun. 8, 2017, which claims priority of European Patent Application No. 16173648.3, filed Jun. 9, 2016, the contents of which are incorporated by reference herein. The PCT International Application was published in the German language.

TECHNICAL FIELD

The invention relates to a method for direct reduction of metal oxide-containing, preferably iron oxide-containing, starting materials, to produce metallized material by contact with hot reduction gas in a reduction unit. The product of the direct reduction is discharged from the reduction unit by a product discharge device which is flushed with seal gas and from which vent gas is drawn and subsequently de-dusted dry. The content of at least one gaseous constituent of the dry de-dusted vent gas is reduced. The invention also relates to a device for carrying out such a method.

TECHNICAL BACKGROUND

In order to obtain metals from metal ores, it is necessary to lower the oxygen content in the ores. One method for lowering the oxygen content is so-called "direct reduction", in which a reduction gas is allowed to act on the solid metal ore in a reduction unit. The solid product of the direct reduction is discharged from the reduction unit and can be processed further in different ways. For example, it is often hot-compacted, for example briquetted, in order to make it easier to handle, and to reduce its specific surface area in order that the procedure of reoxidation, for example as a result of reacting with atmospheric oxygen or $H_2O$ (for example in the form of steam), is made more difficult. It is also known, however, to process the solid product further in other units without compaction. It is often the case that the reduction unit in which the direct reduction proceeds is a so-called "reduction shaft".

It is basically advantageous to protect the product against reoxidation between discharge from the reduction unit and then to subsequent devices, for example devices in which the briquetting proceeds, by handling the product under gas which, with respect to oxidation, is slow-reacting.

Particularly if the reduction gas is under a positive pressure in the reduction unit, it is necessary to ensure that, when removing the product, a simultaneous escape of the generally hot reduction gas is avoided. This occurs for example when a so-called "seal gas" is introduced into the device, by means of which the product is discharged from the reduction unit and which is, as a consequence, also referred to as a "product discharge device". The seal gas is slow-reacting or inert with respect to reaction with the product and is under a pressure which is slightly above the pressure of the reduction gas in order, practically, for the seal gas to form a barrier against escape of the reduction gas.

In the case of iron ores, the product of the direct reduction is referred to, for example, as "direct reduced iron" (DRI) or "hot direct reduced iron" (HDRI) or "sponge iron" or "iron sponge".

A method for direct reduction of metal oxides to produce metallized material by contact with hot reduction gas which is produced at least in part by catalytic reforming of natural gas. The heat for the endothermic reforming processes, which proceed during the reforming, is provided at least in part by combustion of a combustion gas. This is described for example in FIG. 1 of WO2011012452. It is referred to as a "MIDREX® method". In such a MIDREX® method, the product is discharged from the reduction shaft, which is under elevated pressure, by means of a product discharge device. In this case, the product discharge device comprises a discharge member and a material-conveying device which is under a positive pressure, which pressure is lower in comparison with the reduction shaft, or is not under a positive pressure. A corresponding material-conveying device is, for example, often referred to as a "product discharge chamber" (PDC). For the purpose of sealing, that is for the purpose of preventing hot reduction gas from exiting the reduction shaft, slow-reacting seal gas is used, which is also often referred to as "bottom seal gas" (BSG) since it is intended to seal off the bottom end of the reduction shaft. This is shown for example in WO2008123962 and U.S. Pat. No. 4,188,022. The product discharge device is said to be flushed with the seal gas. In a MIDREX® plant, use is often made of dried flue gas from a reformer of a MIDREX® plant, which consists of approximately 80% nitrogen and approximately 20% carbon dioxide and is correspondingly slow-reacting with respect to oxidation of HDRI, as the BSG gas.

The BSG flows through the material column in the discharge member. In the present example, this is a material discharge tube filled with HDRI, also referred to as a "dynamic seal leg", mostly from the point of introduction in the direction of the PDC and to a lesser extent in the direction of the reduction shaft. A large part of the BSG therefore flows into the PDC and has to be diverted therefrom. During the diversion from the PDC, the BSG, then referred to as "vent gas", is laden with dust of the product of the direct reduction. The greater the amount of product of the direct reduction which is discharged by way of the PDC as dust, the less economical the direct reduction method is, since the dust cannot be used, or can be used only with increased effort, for, for example, steel production.

Within the context of this application, the term "vent gas" generally means "seal gas" which is drawn from a product discharge device and not only means seal gas which is diverted from the PDC of a MIDREX® method. The problem of dust being carried in seal gas always exists if seal gas flows through product of the direct reduction.

Release of vent gas into the environment necessitates de-dusting. At present, wet de-dusting is generally carried out, especially in the case of reduction of iron ores. Wet de-dusting results in product of the direct reduction which is discharged with the vent gas, for example iron sponge, entering a slurry system and subsequently having to be disposed of without being able to be used directly for the production of downstream products, for example, in the case of iron sponge, for steel production.

Owing to reactions proceeding between hot DRI, which is also referred to as "hot direct reduced iron" (HDRI) or "hot iron sponge", and carbon dioxide, and owing to outgassing of the hot iron sponge, the vent gas can also contain traces of CO, carbon monoxide. Release of the vent gas into the environment then necessitates sufficient dilution.

Dilution of vent gas is also necessary in order to reduce its temperature or in order to drop below explosion limits for oxidizable constituents of the vent gas, such as CO carbon monoxide, $H_2$ hydrogen, $CH_4$ methane or other hydrocarbons, which have possibly passed from the reduction unit into the PDC.

In the case of dilution with air, also referred to as "infiltrated air", relatively large quantities of infiltrated air are necessary, which causes large quantities of gas to be de-dusted, and for this reason the de-dusting is demanding in terms of apparatus and is energy-intensive.

SUMMARY OF THE INVENTION

Technical Problem

It is the object of the present invention to provide a method and a device which allow simple use of the product of the direct reduction, which is discharged with vent gas, for the production of downstream products. Furthermore, it is sought to reduce the effort associated with de-dusting of the vent gas and with the release thereof into the environment. Specifically, it is sought to make possible simple use of iron sponge, which is discharged with the vent gas from the PDC of a MIDREX® method, as iron sponge product or in subsequent production of steel from the iron sponge.

Technical Solution

The object is achieved by
a method for direct reduction of metal oxide-containing, preferably iron oxide-containing, starting materials to produce metallized material by contact with hot reduction gas in a reduction unit,
wherein the product of the direct reduction is discharged from the reduction unit by means of a product discharge device which is flushed with seal gas and from which vent gas is drawn and subsequently de-dusted,
and wherein the vent gas is de-dusted dry,
the content of at least one gaseous constituent of the de-dusted vent gas is reduced, wherein the content of the constituent is reduced by conversion into $CO_2$ and/or into $H_2O$
  by catalytic conversion using oxygen $O_2$ and/or $H_2O$ in the form of steam,
and/or
  by combustion.

The seal gas is slow-reacting or inert with respect to reaction with the product and is under a pressure which is slightly above the pressure of the reduction gas in order, practically, to form a barrier for the escape of the reduction gas. In a MIDREX® plant, use is made for example of dried flue gas from a reformer of a MIDREX® plant, which consists of approximately 80% nitrogen and approximately 20% carbon dioxide and is correspondingly slow-reacting with respect to oxidation of HDRI.

The vent gas is preferably only de-dusted dry and not de-dusted wet up to release into the environment.

Advantageous Effects of the Invention

Preferably, the metal oxides are iron oxides. However, according to the Richardson-Jeffes diagram, it is furthermore also possible, for example, for oxidic ores of nickel, copper, lead and cobalt to be reduced.

The method for direct reduction may be, for example, a method according to the type MIDREX® with catalytic reforming of hydrocarbons for producing a reduction gas, wherein the reduction gas is produced at least in part by catalytic reforming of a mixture of gaseous hydrocarbons, wherein the heat for the endothermic reforming processes which proceed during the reforming is provided at least in part by combustion of a combustion gas, as described for example in WO2011012448 and WO2011012452, and the full disclosure of which, especially with regard to the reforming, is encompassed by the present application. However, the method may also be for example a direct reduction method on the basis of coal gasification or a smelting-reduction plant, for example in a COREX® DR combined system. In these cases, it would be possible for example for seal gas to be obtained from the reduction gas furnace for heating the reduction gas since, in comparison with the MIDREX® method, a corresponding reformer is not present as a source.

The product of the direct reduction of iron oxide-containing starting materials, DRI or HDRI, is preferably hot-briquetted, for example processed to form hot briquetted iron (HBI). However, it can also be discharged in the hot state from the reduction shaft and can be used directly in a steelworks, for example by being added in a hot state into an electric arc furnace. The degree of metallization is the ratio between metallic iron and total iron in the HBI and is ≥88% for HBI. According to current International Maritime Organization (IMO) regulations, the density of HBI is ≥5 $kg/dm^3$. The density of the hot-briquetted briquetting product may also be below this density, for example if production is carried out from particular raw materials or for particular purposes.

In the case of hot-briquetting, a briquette can be produced directly, or strands, which are also referred to as "slugs", which either break themselves or are broken into smaller pieces by means of breakers, can be produced.

The iron sponge is delivered for example by means of a product discharge chamber (PDC) from the reduction unit to the devices in which the briquetting proceeds. As explained in the corresponding preceding passages of the introduction to the prior art, the product discharge device is charged with seal gas, that is seal gas is introduced into the product discharge device, and vent gas is drawn from the product discharge device. If there is no change to the composition of the seal gas in the product discharge device, the composition of the vent gas corresponds to the seal gas. In comparison with the seal gas introduced, the vent gas is more heavily laden with dust from the product.

According to the invention, the vent gas is de-dusted dry. In this way, the water management and slurry disposal, which are associated with wet de-dusting, are no longer necessary. Moreover, the product of the direct reduction, for example iron sponge, which is discharged from the product discharge device, for example from a PDC, as dust in the vent gas is separated dry and can therefore be used in a simple manner. The dry de-dusting can be realized in a single-stage or multi-stage, for example two-stage, manner. In the case of single-stage dry de-dusting, de-dusting solely by means of filters is for example possible. In the case of two-stage dry de-dusting, firstly coarse de-dusting by means of a cyclone or coarse hot filter and subsequently finer de-dusting by means of dry filters is, for example, possible. Owing to the temperatures of the vent gas, hot-gas filters, for example composed of ceramic materials, are preferred. The dry filters preferably exhibit low pressure loss. In the case of direct reduction of iron ore, the iron sponge is used as iron sponge product or in subsequent production of steel.

For example, the iron sponge separated during the dry de-dusting is preferably a coarse iron sponge separated by means of a coarse hot filter or cyclone. It can be reintroduced into the material-conveying device, for example into a PDC, for example under the action of gravitational force if the dry de-dusting is realized above the PDC.

For example, the dust separated during the dry de-dusting—preferably iron sponge, can be supplied to devices in which briquetting proceeds. Especially for briquetting, the use of the dust from the vent gas is advantageous since this dust generally has a particle size up to a maximum of 3 mm. In the case of briquetting, such dust leads to briquettes of high quality, for example having high density, which can be used further in a particularly economical manner. The dust which is separated during the dry de-dusting can also be recycled with fines which are obtained during the briquetting and which are for example <6 mm. The dust which is separated during the dry de-dusting, for example iron sponge, can also be reintroduced into the reduction unit as metal oxide-containing starting material.

Iron sponge separated during the dry de-dusting can also be supplied as HDRI to corresponding consumers in a steelworks since, in contrast with wet de-dusting, this iron sponge is not cooled during the dry de-dusting.

The dry de-dusted vent gas is substantially free of dust load and is still hot. It has a temperature of approximately 250-750° C. in a MIDREX® method, in which BSG is supplied, for example, at 20-80° C. and dusty vent gas from a PDC has a temperature of approximately 250-750° C. Infiltrated air is not supplied. Vent gas from wet de-dusting has a temperature of approximately 30-100° C.

In comparison with conventional wet de-dusting, it is also the case that significantly smaller quantities of gas have to be handled because, in the dry de-dusting according to the invention, dilution with infiltrated air does not take place prior to the de-dusting step. In a conventional method following a MIDREX® direct reduction, the dust-laden vent gas is diluted to approximately 10-30 times the volume.

Owing to the relatively high temperature and the small quantity of gas, the de-dusted vent gas can be easily freed of undesirable gaseous constituents, for example CO. The vent gas possibly contains gaseous oxidizable constituents, such as CO carbon monoxide, $H_2$ hydrogen, $CH_4$ methane or other hydrocarbons, which have possibly passed from the reduction unit into the PDC.

According to the invention, the content of at least one gaseous constituent of the de-dusted vent gas is thus reduced. The complete removal of the constituent is also encompassed here. Said reduction occurs by conversion into $CO_2$ and/or into $H_2O$—by catalytic conversion using oxygen $O_2$ and/or $H_2O$ in the form of steam,
and/or
by combustion,
for example with regard to the gaseous constituent carbon monoxide CO by conversion into $CO_2$
by catalytic conversion using oxygen $O_2$ and/or $H_2O$ in the form of steam,
and/or
by combustion.

Such conversions proceed in an optimum manner for example for CO and oxygen at 200-800° C. Specifically, oxidation by combustion proceeds at approximately 600-800° C., and catalytic conversion proceeds at temperatures starting from 200° C.

In order to provide for the conversion into $CO_2$ or into $H_2C$ optimum conditions, for example with respect to temperature or oxygen content or steam content, it is possible for example for nitrogen, air or other oxygen-containing and/or steam-containing gases to be supplied. It is also possible for use to be made of gases obtained in the direct reduction method—for example gases such as wet seal gas, dry seal gas, purge gas or bottom seal gas, which are obtained in a MIDREX® method and which differ, for example in terms of steam content and pressure level. After being freed of undesirable constituents in such a way, the vent gas can be released into the environment in a problem-free manner without having to be diluted further.

A further subject of the method is a device for carrying out a method according to the invention, which comprises
 a reduction unit with a reduction gas supply,
 a product discharge device,
 a seal gas supply line opening into the product discharge device,
 a vent gas removal line departing from the product discharge device,
wherein the vent gas removal line opens into a dry de-dusting device, from which departs a diverting device for diverting dry de-dusted vent gas into the atmosphere. The diverting device comprises a device for reducing the content of at least one gaseous constituent of the de-dusted vent gas This device reduces the content
 by catalytic conversion to $CO_2$ and/or $H_2O$ using oxygen $O_2$ and/or $H_2O$ in the form of steam,
and/or
 by combustion to $CO_2$ and/or $H_2O$.

The reduction unit is for example a reduction shaft in which raw material is introduced at the top and product is discharged at the bottom. Reduction by means of reduction gas is realized during the passage through the shaft from the top downward following the gravitational force. Such a reduction shaft is operated for example in a MIDREX® method with reduction gas under a pressure of 0.03-0.3 $MPa_g$ (positive pressure in comparison with the atmospheric pressure of the environment).

The product discharge device comprises, for example a discharge member and a material-conveying device. For example, these may be a material discharge tube with the connection of a seal gas supply line, and, for example, a cellular wheel conveyor.

In the case of a MIDREX® method. In comparison with the atmospheric pressure of the environment, the material-conveying device is under a positive pressure, which is lower in comparison with the reduction shaft, or not under a positive pressure. As already described in the introduction, a corresponding material-conveying device is usually referred to as a "product discharge chamber" (PDC) in a MIDREX® method. A discharge member is, in connection with the MIDREX® method, often referred to as a "dynamic seal leg" (see WO2008123962) or "dynamic gas seal".

The vent gas removal line may depart for example from the PDC.

The vent gas removal line opens into a dry de-dusting device which is equipped, for example, with ceramic filter candles. The filter candles may also consist of CaSi fibers or AlSi or asbestos-like material. The dry de-dusting device may also comprise a cyclone for coarse de-dusting, and ceramic filter candles for fine de-dusting.

Dry dust from the product, for example dust from iron sponge, can, for example, be reintroduced into the PDC, or briquetting presses or material hoppers connected thereto can be provided with a supply, or the dust can be introduced into the reduction unit.

A diverting device for diverting dry de-dusted vent gas into the atmosphere diverts from the dry de-dusting device. The diverting device reduces the content of at least one gaseous constituent of the de-dusted vent gas. Thus, if appropriate, unwanted emissions can be reduced.

According to the invention, the device for reducing the content of at least one gaseous constituent of the de-dusted vent gas is a device for reducing the content
- by catalytic conversion to $CO_2$ and/or $H_2O$ using oxygen $O_2$ and/or $H_2O$ in the form of steam, and/or
- by combustion to $CO_2$ and/or $H_2O$.

These are, for example, burner systems, and are, for example, noble metal-based catalysts, such as platinum, platinum/iron, platinum/ruthenium or platinum/palladium.

According to a preferred variant, the device for reducing the content of at least one gaseous constituent of the de-dusted vent gas is a device for reducing the CO content by
- catalytic conversion to $CO_2$ using oxygen $O_2$ and/or $H_2O$ in the form of steam, and/or
- by combustion to $CO_2$.

These are thus for example burner systems, and are thus for example noble metal-based catalysts, such as platinum, platinum/iron, platinum/ruthenium or platinum/palladium.

Preferably, the device for reducing the content of at least one gaseous constituent of the de-dusted vent gas, preferably the CO content, has at least one supply line for supplying oxygen-containing and/or steam-containing gases.

In comparison with a conventional method with wet de-dusting, the method according to the invention is more productive since the product discharged with the vent gas is not substantially lost as slurry for production of the metal product, but rather can be used easily as dry dust. Treatment of waste water from wet de-dusting is also not necessary, and as a result, outlay in terms of apparatus, investment costs and operating costs are reduced. Release of de-dusted vent gas into the environment is possible with less effort and is able to be realized in a simple manner with reduced content of undesirable constituents. The method according to the invention permits simple retrofitting into existing plants.

The present invention will be explained on the basis of schematically illustrated exemplary embodiments with reference to the following schematic exemplary figures.

DESCRIPTION OF THE EMBODIMENTS

Figure 1:
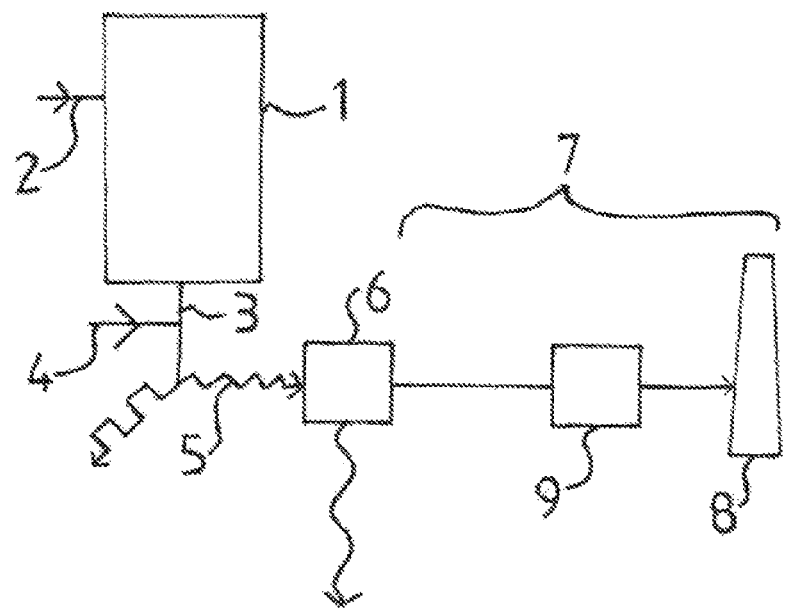
FIG. 1 schematically shows an embodiment of a device according to the invention.

FIG. 1 shows a device for carrying out a method according to the invention. It comprises a reduction unit 1 with a reduction gas supply 2 through which hot reduction gas is guided into the reduction unit. For a better overview, illustration of the introduction of metal oxide-containing starting materials, as raw material, into the reduction unit has been omitted. Exiting from the reduction unit 1 is a product discharge device 3 which discharges the product of the direct reduction from the reduction unit 1. Opening into the product discharge device 3 is a seal gas supply line 4 through which seal gas is introduced into the product discharge device in order to flush the latter with seal gas which exits from the product discharge device 3. Vent gas from the product discharge device 3 is guided out through the vent gas removal line 5. If the product discharge device comprises, for example, a discharge member and a material-conveying device (these not being additionally illustrated here), it is possible for seal gas to be introduced into the discharge member, which seal gas, in part, flows into the material-conveying device and is guided out of the latter as vent gas. The material-conveying device could be, for example, a cellular wheel conveyor or a wiper bar. Discharged product is indicated by an undulating arrow. The vent gas removal line 5 opens into a dry de-dusting device 6 in which the vent gas is de-dusted dry. Discharge of dry dust, for example to consumers mentioned above in the description, is illustrated by an undulating arrow. A diverting device 7 for diverting dry de-dusted vent gas into the atmosphere (schematically illustrated by a line leading to a chimney 8) exits from the dry de-dusting device 6. The diverting device 7 comprises a device 9 for reducing the content of at least one gaseous constituent of the de-dusted vent gas. In the illustrated case, the device 9 is a device for reducing the CO content by oxidation via catalytic conversion using oxygen $O_2$ or $H_2O$ in the form of steam. It could also be a device for reducing the CO content by combustion, that is by a burner system.

Figure 2:
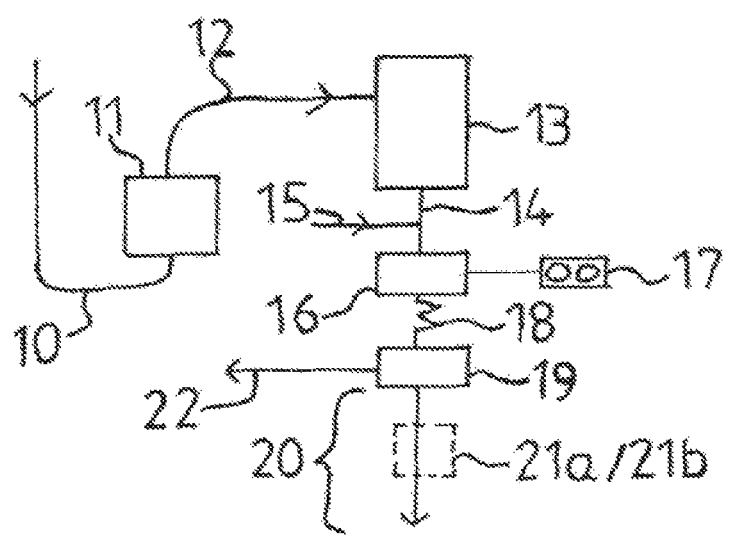
FIG. 2 schematically shows another embodiment of a device according to the invention, in which a MIDREX® method is carried out.

FIG. 2 shows an embodiment in which a MIDREX® method is carried out. Natural gas 10, or if appropriate a mixture of natural gas 10 with a process gas, is guided into a reformer 11 and there is converted into reduction gas. Hot reduction gas is introduced into the reduction shaft 13 by means of the reduction gas supply 12. For a better overview, the illustration of recycling of top gas of the reduction shaft has been omitted. The product discharge device for discharging HDRI from the reduction shaft 13 comprises a dynamic seal leg 14 as a discharge member, into which a seal gas supply line 15 opens, and a PDC 16. The seal gas supplied via the seal gas supply line seals off the reduction shaft 13 with respect to breakthrough of reduction gas and flushes the dynamic seal leg 14 and the PDC 16. HDRI is supplied to a briquetting plant 17 from the product discharge device (in the illustrated example, from the PDC 16 thereof). A vent gas removal line 18 which opens into a dry de-dusting device 19 departs from the product discharge device (in the illustrated example, from the PDC 16 thereof). De-dusted vent gas is released from the dry de-dusting device 19, which can be equipped with ceramic filter candles, and into the environment via the diverting device 20. The dry de-dusting device may optionally also comprise a cyclone upstream of the ceramic filter candles, which, for a better overview, is not additionally illustrated. A device for reducing the CO content in the de-dusted vent gas by catalytic conversion using oxygen 21a, and/or a burner system 21b, indicated by dashed lines, are/is present in the diverting device 20. Dry dust from the dry de-dusting device 19 can be supplied to different destinations via a dust discharge line 22.

In FIG. 1 and FIG. 2, the device for reducing the CO content may also have a supply line for supplying oxygen-containing and/or steam-containing gases. This is not additionally illustrated, however, for the purpose of a better overview.

Even though the invention has been illustrated and described in more detail by way of the preferred exemplary embodiments, the invention is not restricted by the examples disclosed, and other variations may be derived therefrom by a person skilled in the art without departing from the scope of protection of the invention.

The disclosure of the present application also encompasses the entire disclosure of WO08123962, U.S. Pat. No. 4,188,022, WO2011012448 and WO2011012452 incorporated herein by reference.

LIST OF CITATIONS

Patent Literature

WO2011012452
WO2008123962
U.S. Pat. No. 4,188,022
WO2011012448

LIST OF REFERENCE SIGNS

1 Reduction unit
2 Reduction gas supply
3 Product discharge device
4 Seal gas supply line
Vent gas removal line
6 Dry de-dusting device
7 Diverting device
8 Chimney
9 Device for reducing the content of at least one gaseous constituent of the de-dusted vent gas
10 Natural gas
11 Reformer
12 Reduction gas supply
13 Reduction shaft
14 Dynamic seal leg
Seal gas supply line
16 Product discharge chamber (PDC)
17 Briquetting plant
18 Vent gas line
19 Dry de-dusting device
20 Diverting device
21a Device for reducing the CO content in the de-dusted vent gas by catalytic conversion using oxygen
21b Burner system
22 Dust discharge line

The invention claimed is:

1. A method for direct reduction of metal oxide-containing starting materials to produce metallized material, the method comprising:
    performing direct reduction of the starting materials by contacting the starting materials with hot reduction gas in a reduction unit to produce the metallized material;
    depositing the metallized material in a product discharge device;
    discharging the metallized material from the product discharge device;
    flushing the product discharge device with seal gas to produce vent gas, the seal gas being slow-reacting or inert with respect to reaction with the metallized material and is under a pressure which is above the pressure of the reduction gas in order, practically, to form a barrier for escape of the reduction gas, the vent gas containing seal gas and at least one undesirable gaseous oxidizable constituent in the product discharge device, the at least one undesirable gaseous oxidizable constituent being selected from a group consisting of carbon monoxide (CO), hydrogen ($H_2$), methane ($CH_4$), and a hydrocarbon other than methane;
    drawing vent gas from the product discharge device;
    subsequently de-dusting the vent gas by dry de-dusting;
    feeding the dry and de-dusted vent gas directly to a device for reducing content of the at least one undesirable gaseous oxidizable constituent at a temperature in the range 250-750° C.,
    wherein the at least one undesirable gaseous oxidizable constituent of the de-dusted vent gas is converted into $CO_2$ and/or into $H_2O$ by the device for reducing content of the at least one undesirable gaseous oxidizable constituent by:
    a) catalytic conversion using at least oxygen ($O_2$), or $H_2O$ in the form of steam, or oxygen ($O_2$) and $H_2O$ in the form of steam,
    or
    b) combustion,
    or
    c) a combination of a) and b); and
    releasing the vent gas into the environment after converting the at least one undesirable gaseous oxidizable constituent of the de-dusted vent gas.

2. The method as claimed in claim 1, wherein the oxygen-containing and/or steam-containing gases are supplied for the conversion into $CO_2$ and/or $H_2O$.

* * * * *